United States Patent [19]
Komatsu et al.

[11] Patent Number: 5,915,280
[45] Date of Patent: Jun. 22, 1999

[54] ELECTROMAGNETIC FLOWMETER

[75] Inventors: Shingo Komatsu; Tsutomu Goto, both of Kanagawa, Japan

[73] Assignee: Yamatake Corporation, Tokyo, Japan

[21] Appl. No.: 08/735,243

[22] Filed: Oct. 22, 1996

[30] Foreign Application Priority Data

Oct. 27, 1995 [JP] Japan ................................ 7-280832

[51] Int. Cl.$^6$ .................................................. G01F 1/58
[52] U.S. Cl. .................................................. 73/861.12
[58] Field of Search .................... 73/861.12, 861.13, 73/861.14, 861.15, 861.16, 861.17

[56] References Cited

U.S. PATENT DOCUMENTS

| | | | |
|---|---|---|---|
| 4,186,600 | 2/1980 | Appel et al. | 73/861.12 |
| 4,497,212 | 2/1985 | Schmoock | 73/861.12 |
| 4,499,754 | 2/1985 | Akano et al. | 73/861.12 |
| 4,614,121 | 9/1986 | Hansen et al. | 73/861.12 |
| 4,679,442 | 7/1987 | Kubota | 73/861.12 |
| 4,825,703 | 5/1989 | Kubota | 73/861.25 |
| 4,932,268 | 6/1990 | Hafner | 73/861.12 |
| 5,385,055 | 1/1995 | Kubota et al. | 73/861.12 |
| 5,540,103 | 7/1996 | Zingg | 73/861.12 |

FOREIGN PATENT DOCUMENTS 193519   6/1989   Japan .

*Primary Examiner*—Ronald Biegel
*Attorney, Agent, or Firm*—Rothwell, Figg, Ernst & Kurz

[57] ABSTRACT

In an electromagnetic flowmeter, a magnetic field is generated in a direction perpendicular to measured fluid passing through a measurement tube, and electromotive force generated according to a flow rate of the fluid intersecting the magnetic field is detected by a pair of electrodes opposed on a diameter of the measurement tube. The electromagnetic flowmeter includes one pair of electrodes diametrically opposed on the measurement tube, first magnetic circuit forming members mounted on outer peripheries of both ends of the measurement tube, second magnetic circuit forming members for mutually connecting the first magnetic circuit forming members and pressing and supporting coils on the measurement tube, and a case made of non-magnetic material, for covering the measurement tube, the electrodes and the coils.

4 Claims, 3 Drawing Sheets

ELECTROMAGNETIC FLOWMETER

BACKGROUND OF THE INVENTION

1. Field of the Invention

The present invention relates to an electromagnetic flowmeter to generate a magnetic field in a direction perpendicular to measured fluid flowing through a measurement tube, and detect electromotive force generated according to a flow rate of the fluid intersecting the magnetic field through one pair of electrodes diametrically opposed on the measurement tube so as to measure the flow rate.

2. Description of the Prior Art

FIG. 4 is a sectional view showing a conventional electromagnetic flowmeter 50, and FIG. 5 is a perspective view showing a state in which a comparatively wide caliber electromagnetic flowmeter 150 is mounted between ducts 11-1 and 11-2. In FIG. 4, reference numeral 51 is a nonmagnetic measurement tube made of stainless alloy, through which measured fluid serving as conductive liquid can pass, 52a and 52b are coils serving as magnetic field generating means opposed on a diameter of the measurement tube 51 such that a magnetic field can be generated in the measurement tube 51 to have a direction perpendicular to a direction in which the measured fluid flows, 53 is a pair of electrodes opposed on the diameter or the measurement tube 51, and 54 is a steel case serving as a detector obtained by integrally forming an opening 54-1 for accommodating the measurement tube 51, spaces 54-2a and 54-2b for accommodating the coils 52a and 52b, and so forth. Further, reference numerals 55a and 55b are brackets forming a closed magnetic circuit serving as a feedback circuit with magnetic flux Φ between the coils 52a, 52b and the case 54.

A lining material 56 such as fluororesin is applied to an inner surface and an end surface of the measurement tube 51. A liquid contact ring 57 is attached to an end surface of the lining material. For parallel generation of the magnetic field in an entire range of a section of the measurement tube 51, the coils 52a and 52b are positioned and fixed in outer peripheral recesses 51a and 51b in the measurement tube through inner cores 58a and 58b, and are attached to the case 54 through outer cores 59a and 59b, and the brackets 55a and 55b.

The electrodes 53 are attached to the measurement tube 51 such that a distal end of an electrode rod 53a can be positioned inside the measurement tube 51. Further, a signal line (not shown) is attached to the electrode rod 53a.

The electromagnetic flowmeter 50 is interposed between flanges 60-1a and 60-2a at end surfaces of ducts 60-1 and 60-2, and is connected and fixed through coupling members including a screw rod 61 extending between the flanges 60-1a and 60-2a and a nut 62.

An electromagnetic flowmeter 150 shown in FIG. 5 is interposed between flanges 11-1a and 11-2a at end surfaces of ducts 11-1 and 11-2, and is connected and fixed through coupling members including a screw rod 61 extending between the flanges 11-1a and 11-2a and a nut 62. In FIG. 5, reference numeral 154 shows a terminal box.

A description will now be given of the operation with reference to FIG. 6.

The coil 52a is excited by power fed from an unillustrated power supply, thereby generating the magnetic field in the direction perpendicular to an axis of the measurement tube 51. When the measured fluid moves through the measurement tube 51 in the magnetic field, electromotive force is generated by Faraday's law of induction. In this case, the magnetic field is generated in the direction perpendicular to the electrically insulated measurement tube. Measurable voltage is generated between the pair of electrodes 53 unless the flowing liquid has excessively low conductivity. The voltage is proportional to the intensity of the magnetic field, a mean flow velocity of the fluid, and a distance between the electrodes. Thus, it is possible to measure a flow rate by converting the voltage into a signal according to the flow rate in a converter 63.

That is, according to the Faraday's law, the magnitude of induced voltage can be expressed by the following expression:

$$E = kBDv \quad (1)$$

where
B: magnetic flux density (T)
D: bore of measurement tube (m)
v: mean axial fluid velocity (m/s)
E: signal electromotive force (V)
k: constant
Q: volume flow rate (m$^3$/s)

In case of a cylindrical measurement tube, the volume flow rate can be expressed by the following expression:

$$Q = (\pi D^2/4) \cdot v \quad (2)$$

Depending upon the relationship, the expression (1) can be expressed as the following expression (3):

$$Q = (\pi D/4 \text{ kB}) \cdot E \quad (3)$$

If the magnetic flux density B is kept constant, the flow rate in the tube can be found by measuring the signal electromotive force E.

The conventional electromagnetic flowmeter has the above structure. Hence, when the ratio of a diameter of the coil to a bore diameter (of 200 mm or more) of the measurement tube 51 is low, there is a high degree of flexibility in coil design such as the use of a saddle-like coil extending along a tube path. That is, the coil can freely be designed. Further, it is possible to easily form the magnetic flux feedback circuit including the inner cores, the coils, and the outer cores.

However, in case of a small bore diameter (ranging from 10 to 20 mm) of the measurement tube 51, a coil size can not be reduced according to the bore diameter. This is because the coil should inevitably become large with respect to the bore diameter to obtain required magnetic flux density since the electromotive force is proportional to the product of the number of turns and current flowing in the coil. If the coil current is increased to reduce a coil size, the electromagnetic flowmeter used to continuously measure the flow rate runs counter to demands for reduced power consumption, and causes a problem from a safety standpoint at a time of use in dangerous atmospheres.

A description will now be given of a case where the coil current is halved to meet the demands for the reduced power consumption. In order to ensure desired generating magnetic flux with a current value varied, the number of turns should be doubled. However, if the number of turns is simply doubled, the coil requires a doubled overall length. Therefore, a value of resistance of the coil itself is also doubled, resulting in a fourfold increase in heat value.

In this case, there is one technique to keep the value of resistance constant by doubling a wire size. In such a case, since a size of the coil itself is doubled or more, as shown in FIG. 4 a vertically extending portion of the case has a longitudinal form such that the vertically extending portion can be accommodated within a pitch of the screw rod 61 extending between the flanges. Thus, when the outer core forming a part of the magnetic flux circuit includes a combination of two semicircular discs, the overall case is increased in size, thereby running counter to demands for a smaller case. On the other hand, when an outer core including a two-body structure is assembled along a longitudinal coil, the case itself must have a two-body structure. Thus, for example, a joint welded in the vicinity of an electrode portion may corrode, and corrosive fluid may enter the electrode portion, resulting in inconveniences in view of durability.

Further, since the case 54 is made of magnetic material such as iron forming a part of the magnetic circuit, a corrosion resistant coating is required for the case 54, resulting in an increase of manufacturing manpower and a higher cost. Furthermore, when a magnetic tool such as spanner is put on the case 54, partial magnetic flux of the magnetic flux feedback circuit is disturbed by the spanner since the case 54 forms a part of the magnetic circuit. Consequently, the magnetic field in the direction perpendicular to the measured fluid is attracted by the spanner, thereby disturbing an optimal stream of the magnetic flux with respect to the measured fluid.

SUMMARY OF THE INVENTION

In order to overcome the above problems, it is an object of the present invention to provide a reliable and inexpensive electromagnetic flowmeter having excellent corrosion resistance.

According to the present invention, for achieving the above-mentioned objects, there is provided an electromagnetic flowmeter including a measurement tube through which measured fluid can pass, magnetic field generating means for generating in the measurement tube a magnetic field in a direction perpendicular to a direction in which the measured fluid passes, one pair of electrodes opposed on a diameter of the measurement tube, for measuring a signal generated in the measured fluid by the action of the magnetic field, first magnetic circuit forming members mounted on outer peripheries of both ends of the measurement tube, second magnetic circuit forming members for mutually connecting the first magnetic circuit forming members at the both ends of the measurement tube, and pressing and supporting the magnetic field generating means on the measurement tube, and a case made of non-magnetic material, for covering the measurement tube, the electrodes and the magnetic field generating means.

DETAILED DESCRIPTION OF THE PREFERRED EMBODIMENTS

Preferred embodiments of the invention will now be described referring to the accompanying drawings.

Embodiment 1

Figure 1:
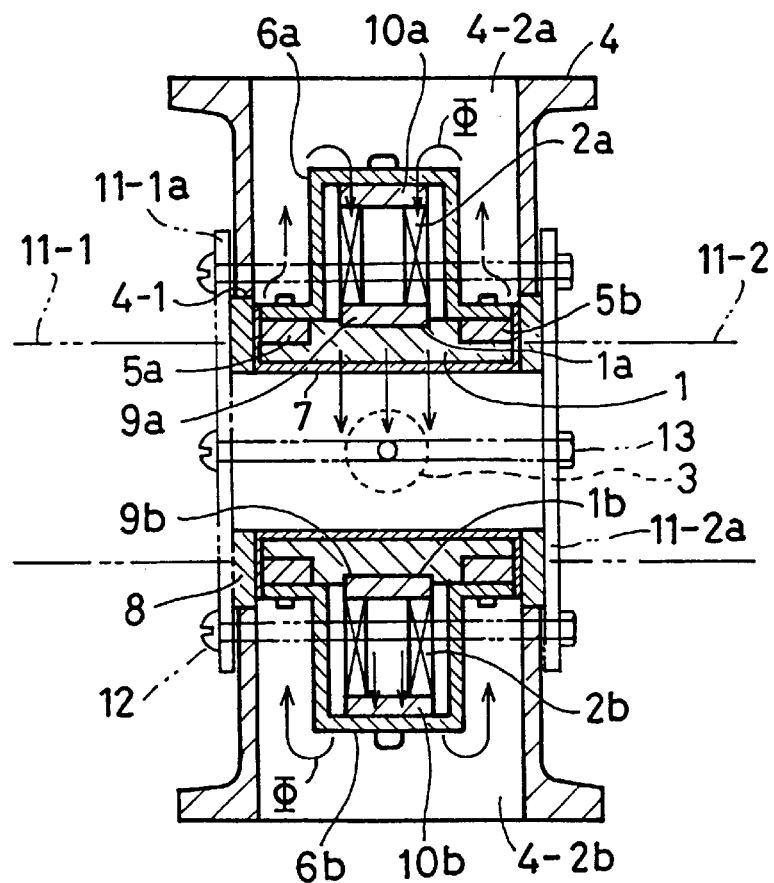
FIG. 1 is a sectional view showing an electromagnetic flowmeter according to the first embodiment of the present invention.

FIG. 1 is a sectional view showing an electromagnetic flowmeter according to the first embodiment of the present invention. In FIG. 1, reference numeral 1 is a non-magnetic measurement tube made of stainless alloy, through which measured fluid serving as conductive liquid can pass, 2a and 2b are coils serving as magnetic field generating means diametrically opposed on the measurement tube 1 such that a magnetic field can be generated in the measurement tube 1 in a direction perpendicular to a direction in which the measured fluid flows, 3 is one pair of electrodes diametrically opposed on the tube 1, 4 is a case serving as a detector obtained by integrally forming an opening 4-1 for accommodating the measurement tube 1, accommodating chambers 4-2a and 4-2b for the coils 2a and 2b, an accommodating chamber (not shown) for the electrodes 3, and so forth. Further, reference numerals 5a and 5b are rings serving as first magnetic circuit forming members mounted on outer peripheries of both ends of the measurement tube 1, and 6a and 6b are brackets serving as second magnetic circuit forming members for mutually connecting the rings 5a and 5b at the both ends of the measurement tube, and pressing and supporting the coils 2a and 2b on the measurement tube 1.

A lining material 7 is applied to an inner surface and an end surface of the measurement tube 1, and a liquid contact ring 8 is attached on an end surface of the lining material. The lining material 7 is made of material such as fluororesin, chloroprene rubber, polyurethane rubber, or ceramic. Further, the liquid contact ring 8 is made of material such as stainless steel, platinum-iridium, tantalum, titanium, Hastelloy B, Hastelloy C, monel metal, or conductive fluororesin.

For parallel generation of the magnetic field in an entire range of a section of the measurement tube 1, the coils 2a and 2b are positioned and fixed in outer peripheral recesses 1a and 1b in the measurement tube through inner cores 9a and 9b, and are attached to an outer surface of the measurement tube by the brackets 6a and 6b through the outer cores 10a and 10b.

The electrodes 3 are attached to the measurement tube 1 such that a distal end of an electrode rod 3a can be positioned inside the measurement tube 1. Further, a signal line (not shown) is attached to the electrode rod 3a.

A description will now be given of a method of assembling the electromagnetic flowmeter including the above component parts. First of all, the rings 5a and 5b are attached to the both ends of the measurement tube 1, and the measurement tube 1 is assembled.

Subsequently, the electrodes 3 are attached to the measurement tube 1 in the accommodating chamber (not shown) defined in the case 4 for the electrodes 3. Concurrently, in the accommodating chambers 4-2a and 4-2b of the case 4, the channel-shaped brackets 6a and 6b together with the coils 2a and 2b are attached to the outer peripheral surface of the measurement tube 1 in an axially symmetrical manner. In the structure, an integral (monocoque) body can be used as the case 4 to eliminate an excess portion to be fused. As a result, the electromagnetic flowmeter having a longitudinal form is easily assembled. Further, since the portions to be fused are reduced, there is an effect in that corrosion resistance can be enhanced.

The electromagnetic flowmeter is interposed between flanges 11-1a and 11-2a at end surfaces of ducts 11-1 and 11-2, and is connected and fixed through coupling members including a screw rod 12 extending between the flanges and a nut 13.

A description will now be given of the operation.

The coils 2a and 2b are excited by power fed from an unillustrated power supply, thereby forming a closed magnetic circuit having a path extending in the order of the coil 2a (2b), the inner core 9a (9b), the ring 5a (5b), the bracket 6a (6b), the outer core 10a (10b), and the coil 2a (2b), and generating the magnetic field in the direction perpendicular to an axis of the measurement tube 1. When the measured fluid moves through the measurement tube 1 in the magnetic field, electromotive force is generated by Faraday's law of induction. In this case, the magnetic field generates in the direction perpendicular to the axial direction of the electrically insulated measurement tube 1. Voltage between the pair of electrodes 3 can be measured unless the flowing liquid has excessively low conductivity. The voltage is proportional to the intensity of the magnetic field, a mean flow velocity of the fluid, and a distance between the electrodes. Thus, it is possible to measure a flow rate by measuring the voltage.

As set forth above, according to the first embodiment, since the first and second magnetic circuit forming members 5a, 5b, 6a, and 6b form the closed magnetic circuit of the magnetic field generated by the coils 2a and 2b, the case 4 can be made of non-magnetic material. As a result, if non-magnetic stainless alloy is utilized as material of the case 4, durability is increased and a corrosion resistant coating is not required. Further, since the first magnetic circuit forming members 5a and 5b are mounted at the both ends of the measurement tube 1, the magnetic circuit is constructed to be short. Accordingly, even when a magnetic member approaches or comes into contact with the case 4, the magnetic field from the coils 2a and 2b can not be disturbed, and stable measurement of the flow rate can be made continuously.

Embodiment 2

Figure 2:
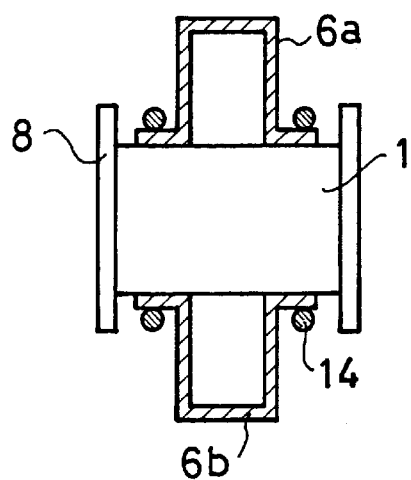
FIG. 2 is a schematic view showing an electromagnetic flowmeter according to the second embodiment of the present invention.

FIG. 2 is a schematic view showing the embodiment 2 of the present invention. Outer peripheries of brackets 6a and 6b serving as second magnetic circuit forming members are fitted into a pressing ring 14 serving as a first magnetic circuit forming member. Thus, the brackets 6a and 6b are attached to an outer peripheral surface of a measurement tube 1 through the pressing ring 14. In this case, attachment of the brackets 6a and 6b can be facilitated.

Embodiment 3

Figure 3:
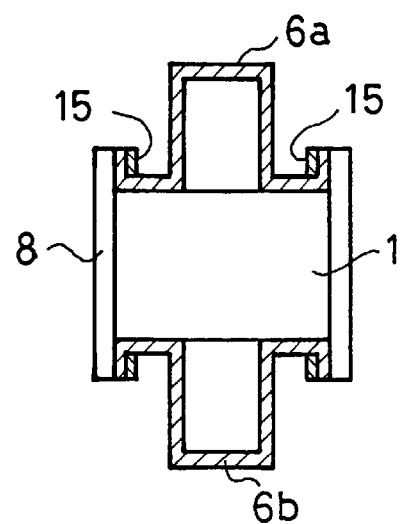
FIG. 3 is a schematic view showing an electromagnetic flowmeter according to the third embodiment of the present invention.
Figure 4:
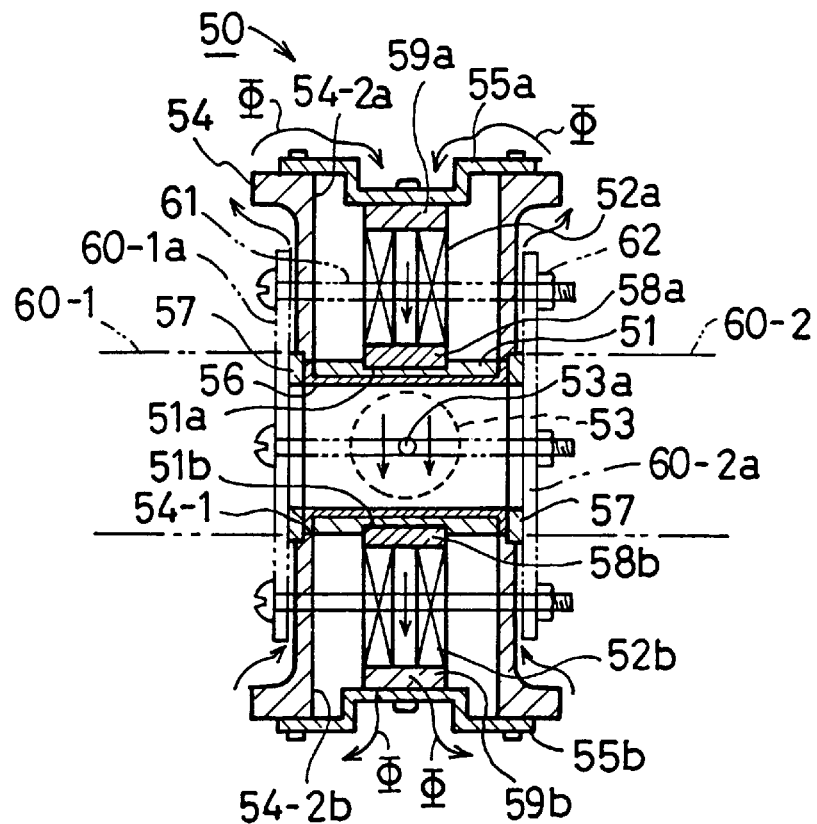
FIG. 4 is a sectional view showing a conventional electromagnetic flowmeter.
Figure 5:
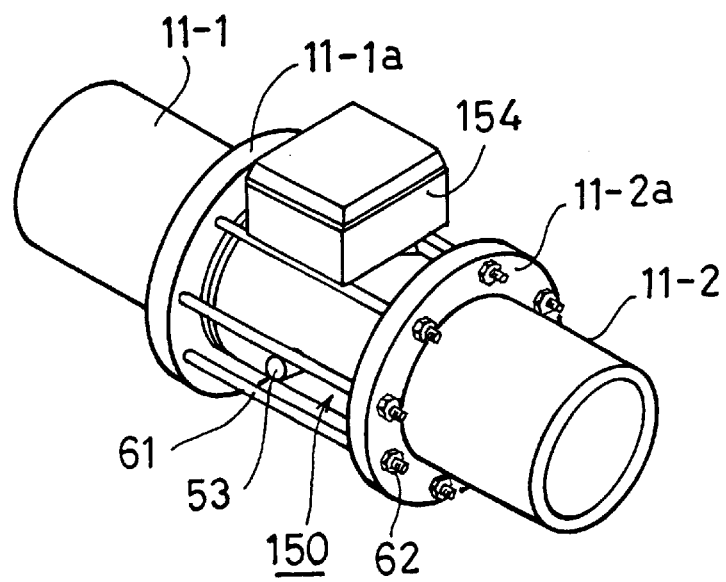
FIG. 5 is a perspective view showing a state in which a comparatively wide caliber electromagnetic flowmeter is attached between ducts.
Figure 6:
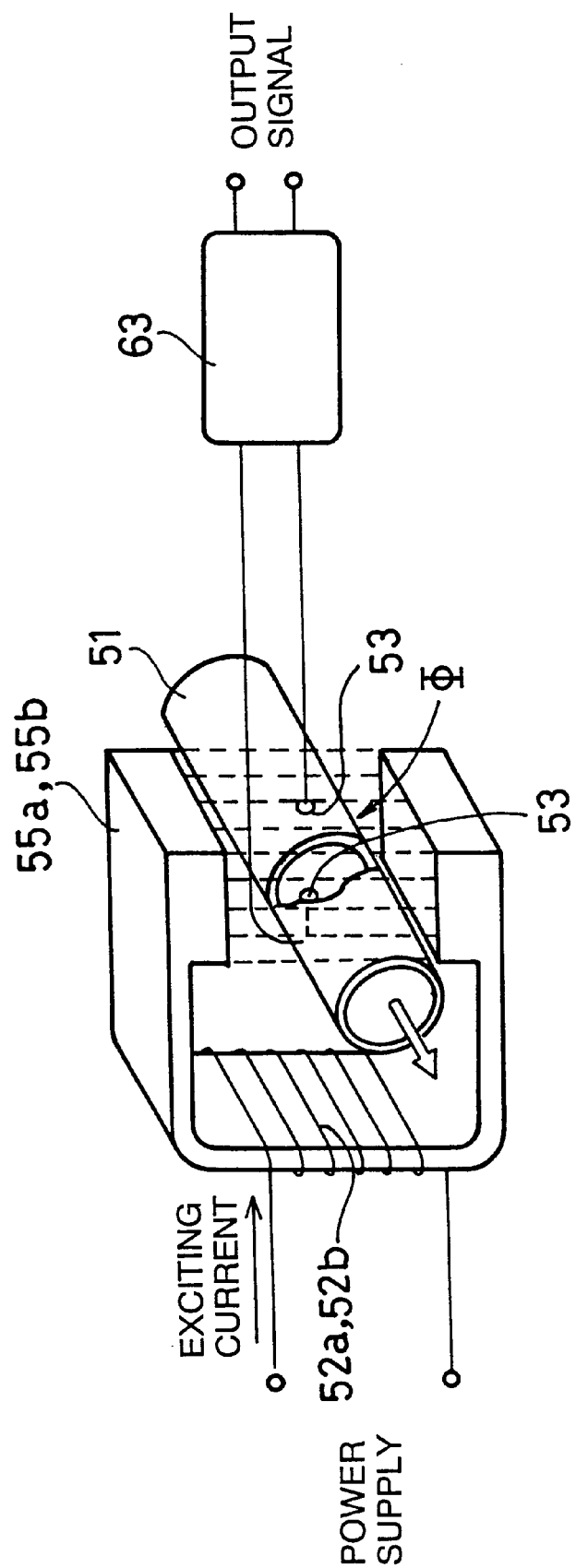
FIG. 6 is an explanatory view showing the principle of measurement made by the electromagnetic flowmeter.

FIG. 3 is a schematic view showing the embodiment 3 of the present invention. In channel-shaped brackets 6a and 6b serving as second magnetic circuit forming members, both side ends are folded in a channel-shaped manner. The folded portions of the brackets 6a and 6b are fitted into a pressing ring 15 serving as a first magnetic circuit forming member. Further, the folded portions together with the pressing rings 15 are welded and fixed to a liquid contact ring 8. In this case, it is possible to securely attach the first and second magnetic circuit forming members so as to surely form a closed magnetic circuit.

As set forth above, according to the present invention, the first magnetic circuit forming members mounted on the outer peripheries of the both ends of the measurement tube are mutually connected through the second magnetic circuit forming members, and the magnetic field generating means are pressed and supported on the measurement tube. Further, since the case can be made of the non-magnetic material such as stainless alloy, it is possible to provide the inexpensive electromagnetic flowmeter having excellent corrosion resistance and requiring no corrosion resistant coating. Further, since the magnetic circuit is constructed to be short, the magnetic circuit is highly efficient because of small magnetic loss. Accordingly, even when a magnetic member approaches or comes into contact with the case 4, the magnetic field can not be disturbed, stable measurement of the flow rate can be made continuously and high reliability is obtained.

What is claimed is:

1. An electromagnetic flowmeter, comprising:

a measurement tube through which measured fluid can pass;

magnetic field generating means for generating in the measurement tube a magnetic field in a direction perpendicular to a direction in which the measured fluid passes;

one pair of electrodes diametrically opposed on the measurement tube, for measuring a signal generated in the measured fluid by the action of the magnetic field;

first magnetic circuit forming members mounted on outer peripheries of both ends of the measurement tube;

a second magnetic circuit forming member connected to first magnetic circuit forming members at each end of the measurement tube, and surrounding the magnetic field generating means for supporting said magnetic field generating means and for pressing said magnetic field generating means against and in direct contact with the measurement tube; and a case made of non-magnetic material, for covering the measurement tube, the electrodes, and the magnetic field generating means.

2. An electromagnetic flowmeter according to claim 1, wherein the first magnetic circuit forming member includes a ring mounted on the outer periphery of the end of the measurement tube.

3. An electromagnetic flowmeter according to claim 1, wherein the first magnetic circuit forming member includes a pressing ring for pressing the second magnetic forming member at the end of the measurement tube on the side of the measurement tube.

4. An electromagnetic flowmeter according to claim 1, wherein both ends of the second magnetic forming member are folded, and the first magnetic forming member being welded and fixed to the folded portion of the second magnetic forming member at the end of the measurement tube.

* * * * *